(12) United States Patent
Mookherjee

(10) Patent No.: US 11,941,566 B2
(45) Date of Patent: Mar. 26, 2024

(54) SYSTEMS AND METHODS FOR ENTERPRISE METADATA MANAGEMENT

(71) Applicant: JPMorgan Chase Bank, N.A., New York, NY (US)

(72) Inventor: Satrajit Mookherjee, Pennington, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 471 days.

(21) Appl. No.: 17/171,449

(22) Filed: Feb. 9, 2021

(65) Prior Publication Data
US 2022/0253783 A1    Aug. 11, 2022

(51) Int. Cl.
*G06Q 10/0639* (2023.01)
*G06F 16/215* (2019.01)
*G06F 16/2458* (2019.01)
*G06F 16/25* (2019.01)
*G06F 16/957* (2019.01)

(52) U.S. Cl.
CPC ..... *G06Q 10/06393* (2013.01); *G06F 16/215* (2019.01); *G06F 16/2462* (2019.01); *G06F 16/252* (2019.01); *G06F 16/9577* (2019.01)

(58) Field of Classification Search
CPC .............................................. G06Q 10/06393
See application file for complete search history.

(56) References Cited

U.S. PATENT DOCUMENTS

| | | | |
|---|---|---|---|
| 2002/0099710 A1* | 7/2002 | Papierniak | G06F 16/217 |
| 2008/0270451 A1* | 10/2008 | Thomsen | G06F 16/256 |
| | | | 707/999.102 |
| 2010/0046842 A1* | 2/2010 | Conwell | G06F 18/22 |
| | | | 382/218 |
| 2012/0246170 A1* | 9/2012 | Lantorno | G06F 11/3672 |
| | | | 707/E17.071 |

(Continued)

OTHER PUBLICATIONS

Jones et al, Managing Scientific Metadata, IEEE Internet Computing, vol. 5, Issue: 5, Sep.-Oct. 2001, pp. 59-68 (Year: 2001).*

(Continued)

*Primary Examiner* — Andre D Boyce
(74) *Attorney, Agent, or Firm* — GREENBLUM & BERNSTEIN, P.L.C.

(57) ABSTRACT

Various methods, apparatuses/systems, and media for managing metadata are disclosed. A processor extracts technical metadata corresponding to enterprise applications from a plurality of databases; builds a metadata repository in a graph database; builds a web-based metadata application based on developing a normalized representation for data flows corresponding to the extracted technical metadata by utilizing the graph database. The extracted technical metadata is stored onto the metadata repository in the graph database. The processor authenticates and authorizes a user to utilize the web-based metadata application; receives search criteria from the user; accesses the metadata repository in the graph database to retrieve the technical metadata and/or data lineage within the enterprise applications from (Continued)

the metadata repository based on received search criteria; and displays the technical metadata and/or the data lineage within the enterprise applications onto a user interface.

20 Claims, 13 Drawing Sheets

(56) References Cited

U.S. PATENT DOCUMENTS

2016/0335454 A1* 11/2016 Choe .................... G06Q 30/018
2016/0371288 A1* 12/2016 Le Biannic ....... G06F 16/24578
2017/0109391 A1*  4/2017 Rosen ................. G06F 16/7867
2017/0264640 A1*  9/2017 Narayanaswamy .........................
                                                       H04L 63/0281

OTHER PUBLICATIONS

Joshi et al, An Integrated Knowledge Graph to Automate Cloud Data Compliance, IEEE Access ( vol. 8), pp. 148541-148555 (Year: 2020).*

* cited by examiner

```
using Neo4j.Driver.V1;
using (var driver = GraphDatabase.Driver("bolt://localhost",
    AuthTokens.Basic("neo4j", "neo4j")))
using (var session = driver.Session())
{
    session.Run("CREATE (a:Person {name:'Arthur', title:'King'})");
    var result = session.Run("MATCH (a:Person) WHERE a.name = 'Arthur' 
RETURN a.name AS name, a.title AS title");

foreach (var record in result)
    {
        Output.WriteLine($"{record["title"].As<string>()} 
{record["name"].As<string>()}");
    }
}
```

```
using Neo4jClient;
using System.Web.Http;
using Neo4jClient.Cypher;

var client = WebApiConfig.client;

client.Cypher.Create("(a:Person {name:'Arthur', title:'King'})").ExecuteWithoutResults();
var result = client.Cypher
    .Match("(a:Person)")
    .Where("a.name == 'Arthur'")
    .Return((a) => new
    {
        name = a.As<Neo4jNode>().name,
        title = a.As<Neo4jNode>().title
    }).Results.ToList();

foreach (var record in result)
{
    Console.Write(record.name + " " + record.title);
}
```

SYSTEMS AND METHODS FOR ENTERPRISE METADATA MANAGEMENT

TECHNICAL FIELD

This disclosure generally relates to metadata management, and, more particularly, to systems and methods for implementing a metadata management module that utilizes graph databases for representing structured data movement within an enterprise.

BACKGROUND

In general, large enterprises, corporations, agencies, institutions, and other organizations are facing a continuing problem of handling, processing, and/or accurately describing a vast amount of data that are crucial to plan actions at store level or market/regional level in an efficient and expedited manner. In enterprises today data may be consumed, stored and distributed by various programs. Important decisions may be made based on those data elements. However, often key stakeholders are not sure how the data has been harnessed. Although there exists tools in the market place around enterprise metadata management, those tools often are costly and results in vendor tie in. Most of them also use a relational back end which is difficult to scale for lineage tracking problems.

SUMMARY

The present disclosure, through one or more of its various aspects, embodiments, and/or specific features or sub-components, may provide, among other features, various systems, servers, devices, methods, media, programs, and platforms for implementing a metadata management module that utilizes graph databases for representing structured data movement within an enterprise, thereby providing transparency into data flow and transformation landscape within systems (i.e., systems for capital market data, systems for loan data, etc., but the disclosure is not limited thereto), increasing confidence of stakeholders and upper management in the trust worthiness of the data, providing a platform for governance and management of data elements within a line of business (LOB), improving developer productivity by reducing effort on data lineage analysis, but the disclosure is not limited thereto.

According to an aspect of the present disclosure, a method for managing metadata by utilizing one or more processors and one or more memories is disclosed. The method may include: extracting technical metadata corresponding to enterprise applications from a plurality of databases; building a metadata repository in a graph database; budding a web-based metadata application based on developing a normalized representation for data flows corresponding to the extracted technical metadata by utilizing the graph database; storing the extracted technical metadata onto the metadata repository in the graph database; authenticating and authorizing a user to utilize the web-based metadata application; receiving search criteria from the user; accessing, by the web-based metadata application, the metadata repository in the graph database to retrieve the technical metadata and/or data lineage within the enterprise applications from the metadata repository based on received search criteria; and displaying the technical metadata and/or the data lineage within the enterprise applications onto a user interface.

According to another aspect of the present disclosure, the graph database may be a NEO4J graph database.

According to a further aspect of the present disclosure, the method may further include: implementing graph traversal techniques and pattern matching algorithm to retrieve the technical metadata and/or data lineage within the enterprise applications from the metadata repository based on different search criteria.

According to an additional aspect of the present disclosure, the method may further include: developing a JSON-based domain language for ingestion of external metadata; and exposing the external metadata via corresponding application programming interface (API); and storing the external metadata onto the graph database, but the disclosure is not limited thereto.

According to yet another aspect of the present disclosure, the method may further include: profiling the plurality of databases and harnessing data quality statistics; and integrating data quality statistics metrics from the plurality of databases into the web-based metadata application.

According to a further aspect of the present disclosure, the method may further include: implementing data quality suite rules to detect and improve data quality.

According to an additional aspect of the present disclosure, the data quality statistics metrics may include one or more of the following data: total count data, percentage of null data, distinct values data, sample values data, and standard summary statistics data, but the disclosure is not limited thereto.

According to yet another aspect of the present disclosure, the method may further include: building the metadata repository in the graph database based on a heuristic based quality score model.

According to a further aspect of the present disclosure, the method may further include: displaying end to end data lineage spanning multiple technology domain in a single visual interface of the user interface using a graphical representation of entity in a format of nodes and relationships.

According to an additional aspect of the present disclosure, the method may further include: displaying impacted database objects for upstream and downstream systems onto the graphical interface.

According to an aspect of the present disclosure, a system for managing metadata is disclosed. The system may include a plurality of databases that store technical metadata corresponding to enterprise applications and a processor operatively coupled to the plurality of databases via a communication network. The processor may be configured to: extract technical metadata corresponding to enterprise applications from a plurality of databases; build a metadata repository in a graph database; build a web-based metadata application based on developing a normalized representation for data flows corresponding to the extracted technical metadata by utilizing the graph database; store the extracted technical metadata onto the metadata repository in the graph database; authenticate and authorize a user to utilize the web-based metadata application; receive search criteria from the user; access, by the web-based metadata application, the metadata repository in the graph database to retrieve the technical metadata and/or data lineage within the enterprise applications from the metadata repository based on received search criteria; and display the technical metadata and/or the data lineage within the enterprise applications onto a user interface.

According to another aspect of the present disclosure, the processor may be further configured to: implement graph traversal techniques and pattern matching algorithm to retrieve the technical metadata and/or data lineage within the enterprise applications from the metadata repository based on different search criteria.

According to yet another aspect of the present disclosure, the processor may be further configured to: develop a JSON-based domain language for ingestion of external metadata; and expose the external metadata via corresponding application programming interface (API); and store the external metadata onto the graph database, but the disclosure is not limited thereto.

According to a further aspect of the present disclosure, the processor may be further configured to: profile the plurality of databases and harnessing data quality statistics; integrate data quality statistics metrics from the plurality of databases into the web-based metadata application.

According to an additional aspect of the present disclosure, the processor may be further configured to: implement data quality suite rules to detect and improve data quality.

According to yet another aspect of the present disclosure, the processor may be further configured to: build the metadata repository in the graph database based on a heuristic based quality score model.

According to a further aspect of the present disclosure, the processor may be further configured to: display end to end data lineage spanning multiple technology domain in a single visual interface of the user interface using a graphical representation of entity in a format of nodes and relationships.

According to another aspect of the present disclosure, the processor may be further configured to: display impacted database objects for upstream and downstream systems onto the graphical interface.

According to an aspect of the present disclosure, a non-transitory computer readable medium configured to store instructions for managing metadata is disclosed. The instructions, when executed, may cause a processor to perform the following: extracting technical metadata corresponding to enterprise applications from a plurality of databases; building a metadata repository in a graph database; building a web-based metadata application based on developing a normalized representation for data flows corresponding to the extracted technical metadata by utilizing the graph database; storing the extracted technical metadata onto the metadata repository in the graph database; authenticating and authorizing a user to utilize the web-based metadata application; receiving search criteria from the user; accessing, by the web-based metadata application, the metadata repository in the graph database to retrieve the technical metadata and/or data lineage within the enterprise applications from the metadata repository based on received search criteria; and displaying the technical metadata and/or the data lineage within the enterprise applications onto a user interface.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6A illustrates an exemplary Cypher query syntax in accordance with an exemplary embodiment.

FIG. 6B illustrates an exemplary pseudo code to build Cypher queries in accordance with an exemplary embodiment.

DETAILED DESCRIPTION

Figure 1:
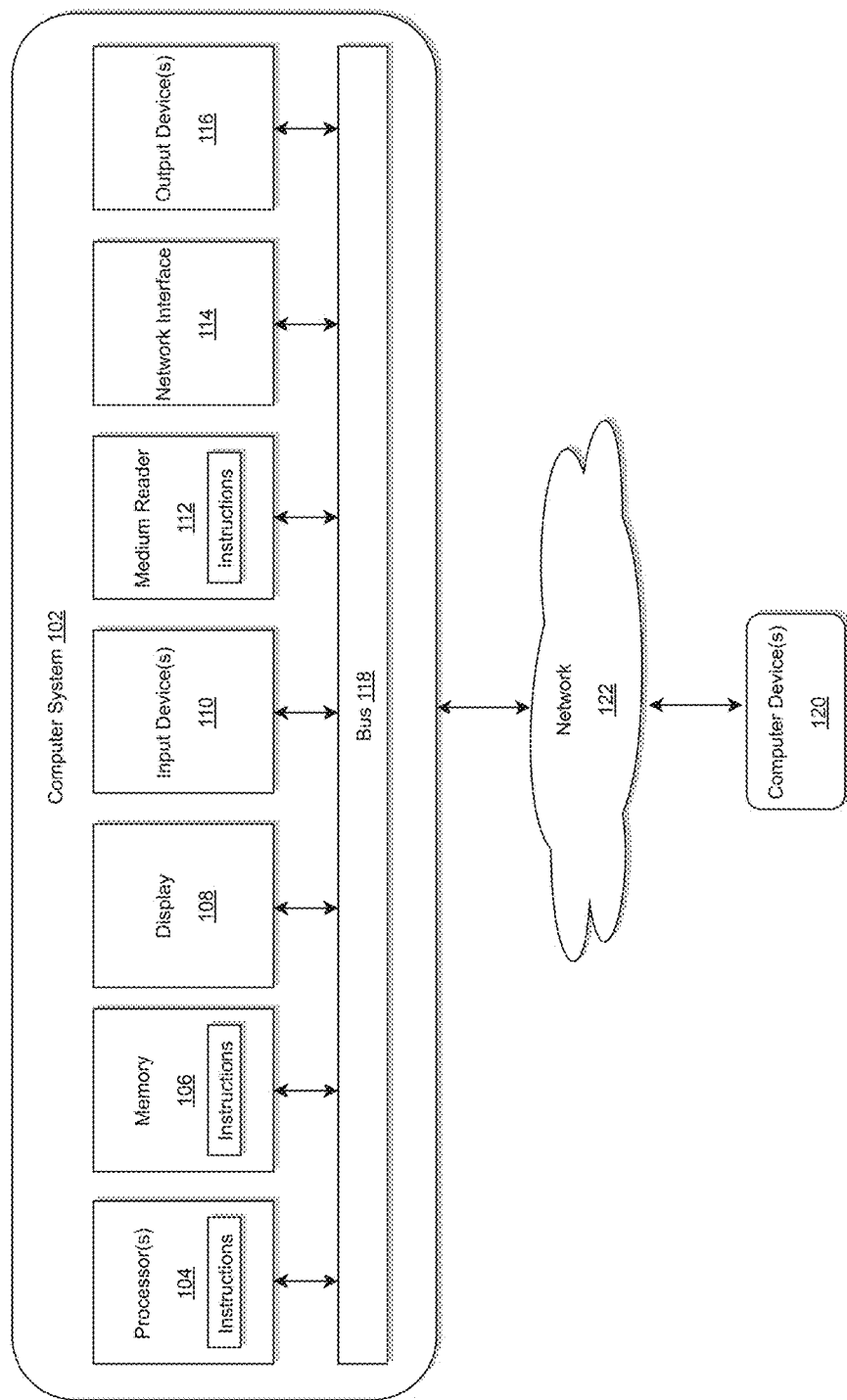
FIG. 1 illustrates a computer system for managing metadata in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines and/or modules. Those skilled in the art will appreciate that these blocks, units, engines, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, and/or modules being implemented by microprocessors or similar, they may be programmed using software (e.g., microcode) to perform various functions discussed herein and may optionally be driven by firmware and/or software. Alternatively, each block, unit, engine, and/or module may be implemented by dedicated hardware, or as a combination of dedicated hardware to perform some functions and a processor (e.g., one or more programmed microprocessors and associated circuitry) to perform other functions. Also, each block, unit, engine, and/or module of the example embodiments may be physically separated into two or more interacting and discrete blocks, units, engines, and/or modules without departing from the scope of the inventive concepts. Further, the blocks, units, engines, and/or modules of the example embodiments may be physically combined into more complex blocks, units, engines, and/or modules without departing from the scope of the present disclosure.

FIG. 1 is an exemplary system for use in implementing a metadata management module that utilizes graph databases for representing structured data movement within an enterprise in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other knower display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar or the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a metadata management module that utilizes graph databases for representing structured data movement within an enterprise, thereby providing transparency into data flow and transformation landscape within systems (i.e., systems for capital market data, systems for loan data, etc., but the disclosure is not limited thereto), increasing confidence of stakeholders and upper management in the trust worthiness of the data, providing a platform for governance and management of data elements within a line of business (LOB), improving developer productivity by reducing effort on data lineage analysis, but the disclosure is not limited thereto.

Figure 2:
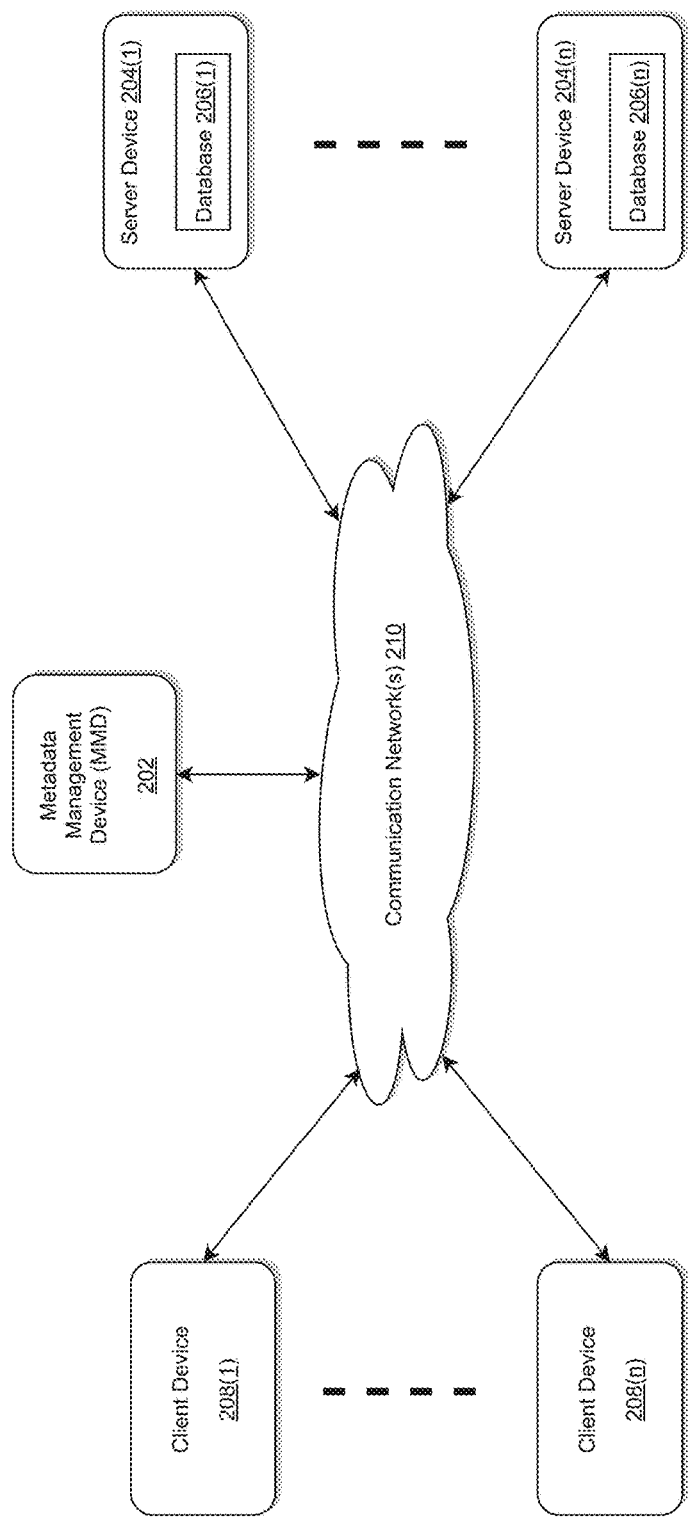
FIG. 2 illustrates an exemplary diagram of a network environment with a metadata management device of FIG. 1 in accordance with an exemplary embodiment.

Referring to FIG. 2, a schematic of an exemplary network environment 200 for implementing metadata management device (MMD) of the instant disclosure is illustrated.

According to exemplary embodiments, the above-described problems associated with conventional methods and systems may be overcome by implementing an MMD 202 as illustrated in FIG. 2 by implementing a metadata management module (i.e., web-based metadata management application) that utilizes graph databases for representing structured data movement within an enterprise, thereby providing transparency into data flow and transformation landscape within systems (i.e., systems for capital market data, systems for loan data, etc., but the disclosure is not limited thereto), increasing confidence of stakeholders and upper management in the trust worthiness of the data, providing a platform for governance and management of data elements within a line of business (LOB), improving developer productivity by reducing effort on data lineage analysis, but the disclosure is not limited thereto.

The MMD 202 may be the same or similar to the computer system 102 as described with respect to FIG. 1.

The MMD 202 may store one or more applications that can include executable instructions that, when executed by the MMD 202, cause the MMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MMD 202 itself, may be located in virtual server(s) running in a cloud-based computing environment rather than being tied to one or more specific physical network computing devices. Also, the application(s) may be running in one or more virtual machines (VMs) executing on the MMD 202. Additionally, in one or more embodiments of this technology, virtual machine(s) running on the MMD 202 may be managed or supervised by a hypervisor.

In the network environment 200 of FIG. 2, the MMD 202 is coupled to a plurality of server devices 204(1)-204(n) that hosts a plurality of databases 206(1)-206(n), and also to a plurality of client devices 208(1)-208(n) via communication network(s) 210. A communication interface of the MMD 202, such as the network interface 114 of the computer system 102 of FIG. 1, operatively couples and communicates between the MMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MMD 202 may be a standalone device or integrated with one or more other devices or apparatuses, such as one or more of the server devices 204(1)-204(n), for example. In one particular example, the MMD 202 may be hosted by one of the server devices 204(1)-204(n), and other arrangements are also possible. Moreover, one or more of the devices of the MMD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MMD 202 via the communication network(s) 210 according to the HTTP-based and/or JavaScript Object Notation (JSON) protocol, for example, although other protocols may also be used.

The server devices 204(1)-204(n) may be hardware or software or may represent system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the MMD 202 that may be configured for implementing a metadata management module that utilizes graph databases for representing structured data movement within an enterprise, thereby providing transparency into data flow and transformation landscape within systems (i.e., systems for capital market data, systems for loan data, etc., but the disclosure is not limited thereto), increasing confidence of stakeholders and upper management in the trust worthiness of the data, providing a platform for governance and management of data elements within a line of business (LOB), improving developer productivity by reducing effort on data lineage analysis, but the disclosure not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the MMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MMD 202, the server devices 204(1)-204(n), or the client devices 208(1)-208(n), for example, may be configured to operate as virtual instances on the same physical machine. For example, one or more of the MMD 202, the server devices 204(1)-204(n) or the client devices 208(1)-208(n) may operate on the same physical device rather than as separate devices communicating through communication network(s) 210. Additionally, there may be more or fewer MMDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
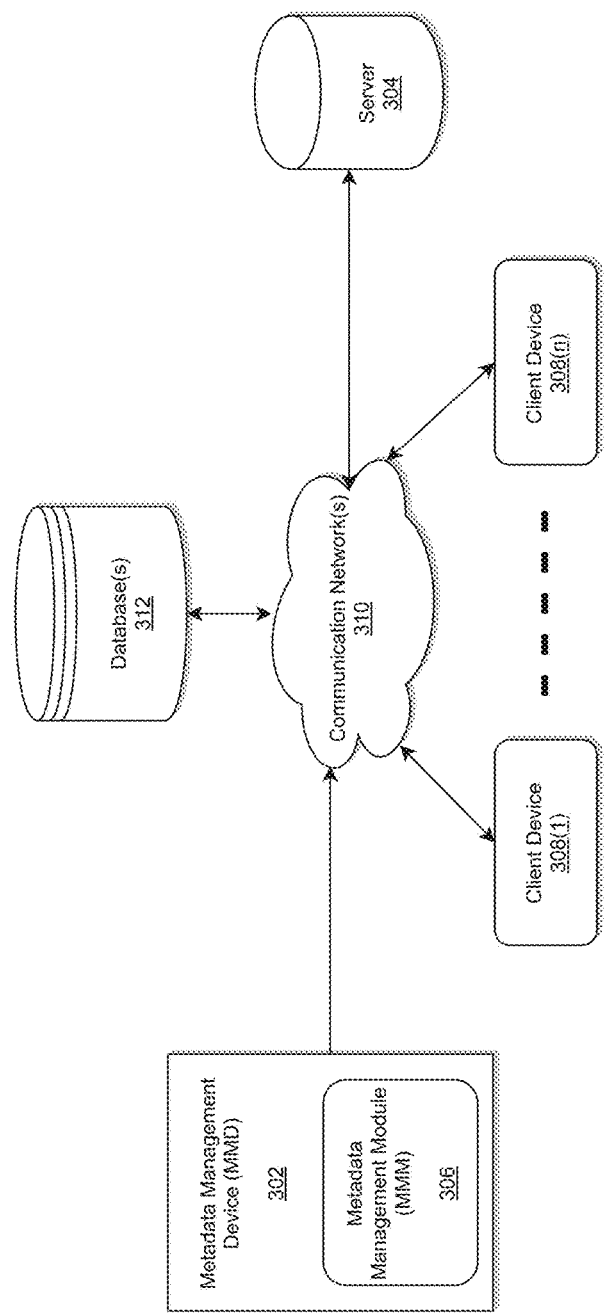
FIG. 3 illustrates a system diagram for implementing a metadata management device with a metadata management module in accordance with an exemplary embodiment.

FIG. 3 illustrates a system diagram 300 for implementing a metadata management device (MMD) with a metadata management module (MMM) in accordance with an exemplary embodiment.

As illustrated in FIG. 3, the MMD 302 including the MMM 306 may be connected to a server 304, and a database (e.g., data hub) 312 via a communication network 310, but the disclosure is not limited thereto. Although only one database 312 is illustrated in FIG. 3, it should be noted that any desired number of databases or repositories may be utilized by the MMM 306. The database 312 may store one or more enterprise applications, technical metadata corresponding to the enterprise applications but the disclosure is not limited thereto.

The MMD 302 may also be connected to a plurality of client devices 308(1)-308(n) via the communication network 310, but the disclosure is not limited thereto. According to exemplary embodiments, the MMM 306 may be implemented within the client devices 308(1)-308(n), but the disclosure is not limited thereto. According to exemplary embodiments, the client devices 308(1)-308(n) may be utilized for implementing the MMM 306, but the disclosure is not limited thereto.

According to exemplary embodiment, the MMD 302 is described and shown in FIG. 3 as including the MMM 306, although it may include other rules, policies, modules, databases, or applications, for example. According to exemplary embodiments, the database 312 may be embedded within the MMD 302. The database 312, via the server 304, may include one or more memories configured to store login information, data files, data content, etc., but the disclosure is not limited thereto. According to exemplary embodiments, the MMM 306 may be configured to be storage platform agnostic—configured to be deployed across multiple storage layers.

According to exemplary embodiments, the MMM 306 may be configured to receive continuous feed of data from the database 312 and the server 304 via the communication network 310.

As will be described below, the MMM 306 may be configured to extract technical metadata corresponding to enterprise applications from a plurality of databases; build a metadata repository in a graph database; build a web-based metadata application based on developing a normalized representation for data flows corresponding to the extracted technical metadata by utilizing the graph database; store the extracted technical metadata onto the metadata repository in the graph database; authenticate and authorize a user to utilize the web-based metadata application; receive search criteria from the user; access, by the web-based metadata application, the metadata repository in the graph database to retrieve the technical metadata and/or data lineage within the enterprise applications from the metadata repository based on received search criteria; and display the technical metadata and/or the data lineage within the enterprise applications onto a user interface, but the disclosure is not limited thereto.

The plurality of client devices 308(1)-308(n) are illustrated as being in communication with the MMD 302. In this regard, the plurality of client devices 308(1)-308(n) may be "clients" of the MMD 302 and are described herein as such. Nevertheless, it is to be known and understood that the plurality of client devices 308(1)-308(n) need not necessarily be "clients" of the MMD 302, or any entity described in association therewith herein. Any additional or alternative relationship may exist between either or more of the plurality of client devices 308(1)-308(n) and the MMD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the MMD 302 via broadband or cellular communication. Of course, these embodiments are merely exemplary and are not limiting or exhaustive.

Figure 4:
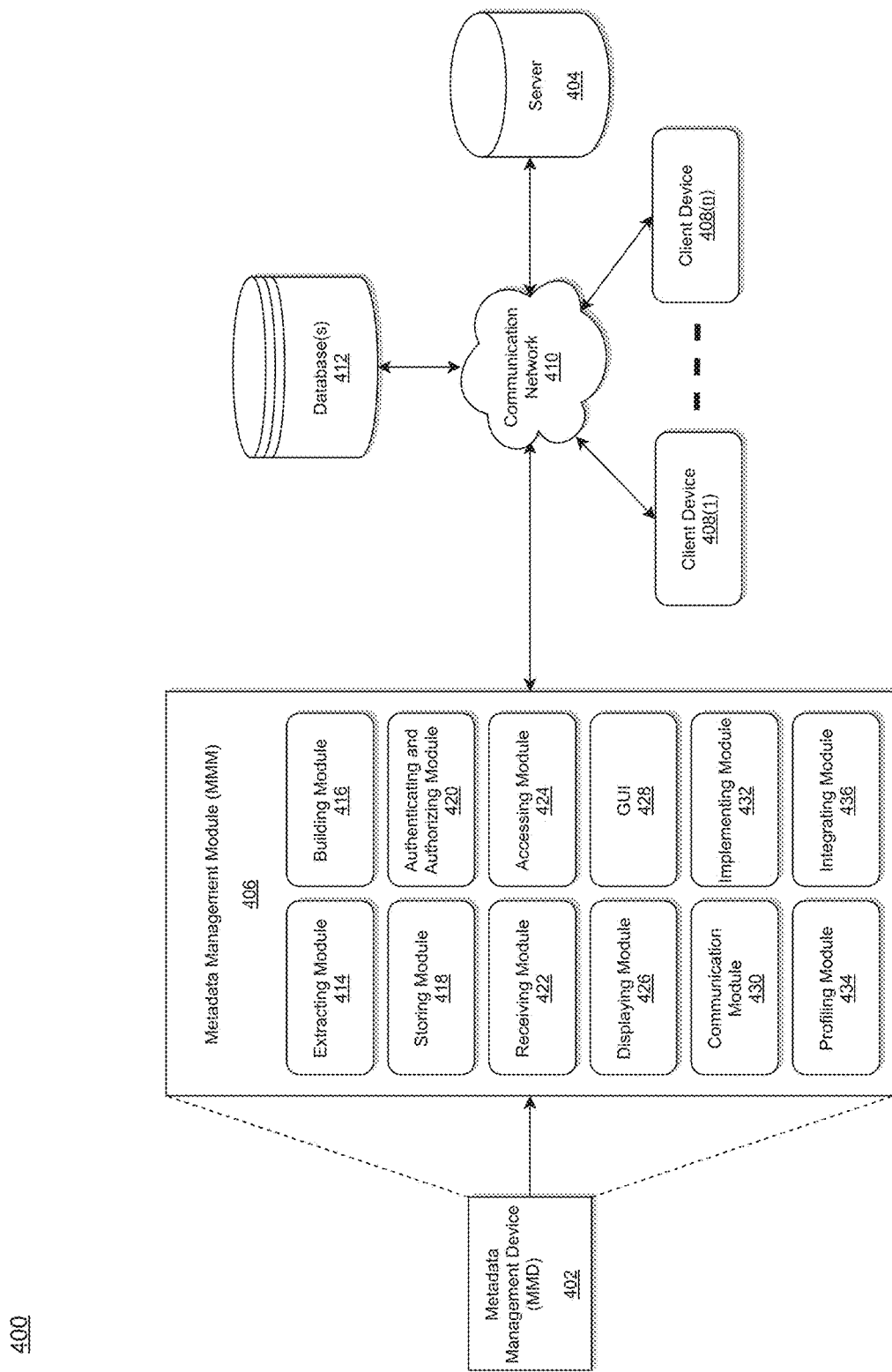
FIG. 4 illustrates a system diagram for implementing a metadata management module of FIG. 3 in accordance with an exemplary embodiment.

FIG. 4 illustrates a system diagram for implementing an MMM of FIG. 3 in accordance with an exemplary embodiment. As illustrated in FIG. 4, the system 400 may include an MMD 402 within which an MMM 406 may be embedded, a database (i.e., data hub) 412, a server 404, client devices 408(1)-408(n), and a communication network 410. According to exemplary embodiments, the MMD 402, the MMM 406, the database 412, the server 404, the client devices 408(1)-408(n), and the communication network 410 as illustrated in FIG. 4 may be the same or similar to the MMD 302, the MMM 306, the database 312, the server 304, the client devices 308(1)-308(n), and the communication network 310, respectively, as illustrated in FIG. 3.

According to exemplary embodiments, although only one database 412 is illustrated in FIG. 4, it should be noted that any desired number of databases or repositories may be utilized by the MMM 406. The database 412 may store technical metadata corresponding to enterprise applications in accordance with exemplary embodiments disclosed herein, but the disclosure is not limited thereto.

As illustrated in FIG. 4, the MMM 406 may include an extracting module 414, a building module 416, a storing module 418, an authenticating and authorizing module 420, a receiving module 422, an accessing module 424, a displaying module 426, a GUI 428, a communication module 430, an implementing module 432, a profiling module 434 and an integrating module 436. According to exemplary embodiments, the database 412 may be external to the MMD 402 may include various systems that are managed and operated by an organization. Alternatively, according to exemplary embodiments, the database 412 may be embedded within the MMD 402 and/or the MMM 406.

According to exemplary embodiments, the MMM 406 may be implemented via user interfaces, e.g., web user interface, etc., but the disclosure is not limited thereto, and may be integrated with a private cloud platform via the MMM 406 and an authentication service, but the disclosure is not limited thereto. The user interface may be operatively connected to a system of record in one end and an open source platform for analytics and dashboard in another end.

The process may be executed via the communication module 430 and the communication network 410, which may comprise plural networks as described above. For example, in an exemplary embodiment, the various components of the MMM 406 may communicate with the server 404, and the database 412 via the communication module 430 and the communication network 410. Of course, these embodiments are merely exemplary and are not limiting or exhaustive.

According to exemplary embodiments, the communication network 410 and the communication module 430 may be configured to establish a link between the database 412, the client devices 408(1)-408(n), and the MMM 406.

According to exemplary embodiments, each of the extracting module 414, building module 416, storing module 418, authenticating and authorizing module 420, receiving module 422, accessing module 424, displaying module 426, communication module 430, implementing module 432, profiling module 434 and the integrating module 436 may be implemented by microprocessors or similar, they may be programmed using software (e.g., microcode) to perform various functions discussed herein and may optionally be driven by firmware and/or software. Alternatively, each of the extracting module 414, building module 416, storing module 418, authenticating and authorizing module 420, receiving module 422, accessing module 424, displaying module 426, communication module 430, implementing module 432, profiling module 434 and the integrating module 436 may be implemented by dedicated hardware, or as a combination of dedicated hardware to perform some functions and a processor (e.g., one or more programmed microprocessors and associated circuitry) to perform other functions. Also, according to exemplary embodiments, each of the extracting module 414, building module 416, storing module 418, authenticating and authorizing module 420, receiving module 422, accessing module 424, displaying module 426, communication module 430, implementing module 432, profiling module 434 and the integrating module 436 may be physically separated into two or more interacting and discrete blocks, units, devices, and/or modules without departing from the scope of the inventive concepts.

According to exemplary embodiments, each of the extracting module 414, building module 416, storing module 418, authenticating and authorizing module 420, receiving module 422, accessing module 424, displaying module 426, communication module 430, implementing module 432, profiling module 434 and the integrating module 436 of the MMM 406 may be called by corresponding API, but the disclosure is not limited thereto.

Figure 5:
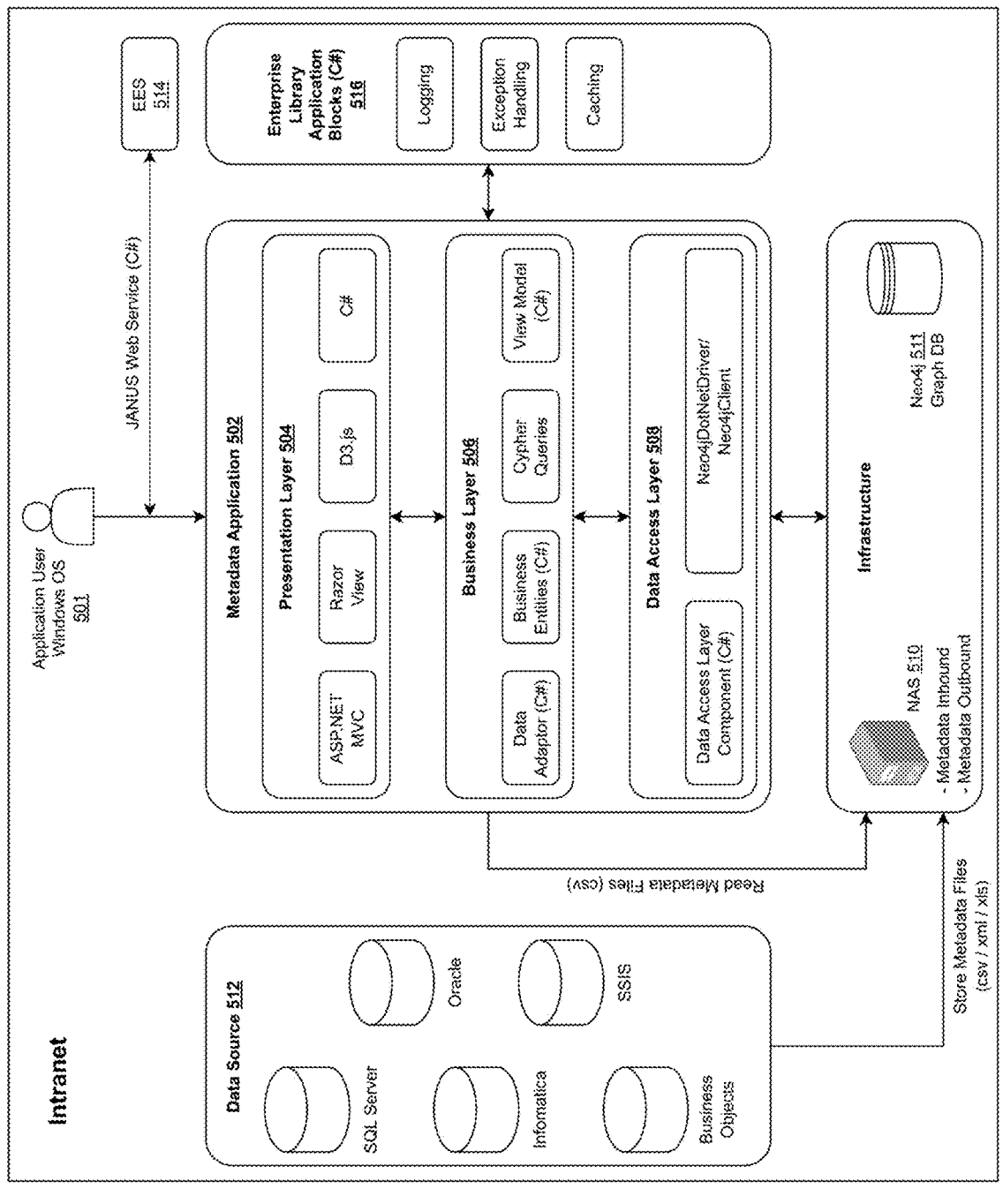
FIG. 5 illustrates an exemplary block diagram of a metadata high level architecture in accordance with an exemplary embodiment.

FIG. 5 illustrates an exemplary block diagram of a metadata high level architecture in accordance with an exemplary embodiment.

As illustrated in FIG. 5, the exemplary block diagram 500 may include a metadata application 502 which may include a presentation layer 504 (also referred to as presentation/UI layer), a business layer 506 and a data access layer 508. The metadata application 502 may be configured to communicate with infrastructure, such as network attached storage (NAS) 510 that may store inbound and outbound metadata and a graph database 511. The graph database may be a Neo4J graph database.

According to exemplary embodiments, the exemplary block diagram 500 may also include a plurality of data sources 512, such as SQL server, Oracle, enterprise cloud data management (i.e., Informatica), SQL server integration services (SSIS), business objects, etc., but the disclosure is not limited thereto. The plurality of data sources 512 may be in communication with the NAS 510 and the graph database 511. Metadata files may be accessed from the data sources 512 and may be stored in the NAS 510 and the graph database 511. According to exemplary embodiments, the metadata files may be in .csv, .xml, or .xls format, but the disclosure is not limited thereto.

According to exemplary embodiments, the exemplary block diagram 500 may also include an enterprise entitlement system 514 and an enterprise library application blocks 516. The metadata application 502 may communicate with the enterprise entitlement system (EES) 514 for receiving JANUS web service. The metadata application 502 may communicate with the enterprise library application blocks 516 for logging, exception handling, and caching.

According to exemplary embodiments, the metadata application 502 may be designed using the three layer architecture, including the presentation layer 504, business layer 506 and data access layer 508. The presentation layer 504 may be developed using Microsoft recommended and industry standard web framework—ASP.NET MVC. The business layer 506 and the data access layer 508 may be developed using .NET framework 4.5 Base Class Library [BCL] and custom classes in C#. Application cross cutting functionality like logging, caching, exception handling etc. may be implemented using the enterprise library application blocks 516. External infrastructure may consist of pre-defined NAS drive 510 for storing raw metadata, configuration files, generated output metadata files etc. and the Neo4j database 511 may be utilized as a centralized repository for the metadata application 502.

FIG. 5 represents high level solution architecture, different application components, external systems and its integration with the metadata application 502.

According to exemplary embodiments, the metadata application 502 may follow single sign on model for user authentication. Janus API may be used to integrate the metadata application 502 with the EES 514. On successful authentication, Janus service may return a list of all the authorized roles for logged in user.

Following roles may be set up within the EES which may provide different levels of access:

| Role - Functionality mapping | Business Analyst | Data Analyst | Data Steward | Power User/Admin |
| --- | --- | --- | --- | --- |
| Metadata Catalog search | X | X | X | X |
| View Data Lineage | X | X | X | X |
| Impact Analysis | | X | X | X |
| Custom Upload Interface | | | X | X |
| Metadata Refresh/Reload | | | | X |

According to exemplary embodiments, web framework ASP.NET MVC may be utilized to build entire application solution. UI components may be developed using HTML and Razor view engine. UI layer may provide the following functionalities to the user 501:

Catalog view: User 501 can select entity by viewing database object from the catalog view. Data may be represented in a drill-down tree structure format for each of the repository. User 501 can select individual data entity from the drill down and its relevant properties may be displayed accordingly on a web page.

Entity search: User 501 may be able to search database entity and can view entity properties. Entity properties may be shown using a tabular format. Depending on data repository and data entity, certain entity properties may be editable to the user 501. For example, user 501 may be able to update a business glossary for SQL Server Table column, but 'edit-update' functionality won't be available for SSIS packages.

Impact analysis: This screen may display the impacted database objects for upstream and downstream systems.

Data lineage: This screen may be used to identify the data lineage using a graphical representation of entity in the format of nodes and relationships. Commonly used client side JavaScript library D3.JS may be used to render nodes and its relationship on a web page. D3 is extremely fast, support large datasets and dynamic behaviors for interaction and animation. It also supports modern browsers, which generally means everything except IE8 and older versions.

Custom upload: User 501 can upload custom metadata like business glossary and java (or any other) programs using this screen. User 501 may input the data using a predefined XLS template. This file may then be processed by .NET adapters and metadata may be then bulk uploaded into Neo4j database.

According to exemplary embodiments, the business layer 506 (also referred to as business access layer) may serve as an intermediary for data exchange between the user interfaces (i.e., the presentation layer 504) and the data access layer 508. The business layer 506 may be used to enforce business validation and data rules. It may include business entities, validation, view model and cypher query templates, etc., but the disclosure is not limited thereto.

Components of the business layer 506 may be implemented using .NET framework 4.5 and C# custom classes. .NET framework 4.5 may provide many useful application level patterns like async-await, Task Parallel Library [TPL] which may provide developer friendly APIs to build asynchronous and responsive web application.

Entities of the business layer 506 may leverage .NET framework features to encapsulate business rules/expressions like mandatory fields, input length restriction, input types etc., but the disclosure is not limited thereto.

According to exemplary embodiments, the business layer 506 may include the following components, but the disclosure is not limited thereto: data adaptor, business entities, cypher queries, view model, etc.

According to exemplary embodiments, the presentation layer UI may use data adapter component to load the metadata from various data sources 512 (Oracle-table, SQL Server-table, BO, Informatica and SSIS).

Adapter component may be based on factory, facade design pattern. It may parse CSV, XLS or XML based raw metadata file, validate the metadata and convert it into CSV format for uploading the data into Neo4j database 511. Along with raw metadata file, adapter may take configuration XML as an input. Configuration XML may contain the information of the attributes to be extracted from the raw metadata files. One configuration XML per source (Oracle-table, SQL Server-table, BO, Informatica etc.) may exist. See, for example FIG. 6.

Figure 6:
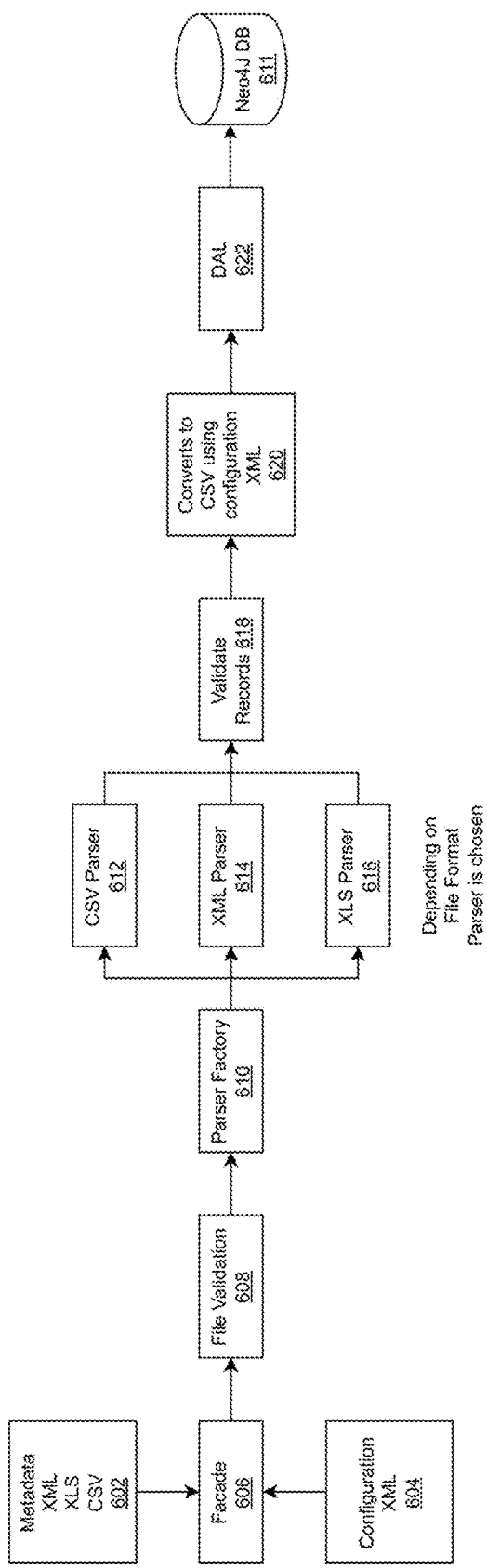
FIG. 6 illustrates a refresh process executed by the metadata management module of FIG. 4 in accordance with an exemplary embodiment.

FIG. 6 illustrates a refresh process 600 executed by the MMM 406 of FIG. 4 in accordance with an exemplary embodiment.

As illustrated in FIG. 6, according to exemplary embodiments, components of the data adapter may include file parser facade 606, parser factory 610, CSV parser 612, XML parser 614, and XLS parser 616.

The file parser facade 606 may be an entry point to the adapter component. It may take the raw metadata file 602 and attribute configuration XML 604 as input, perform IO validation on the metadata file and configuration file and instantiate the parser factory 610.

The parser factory 610—basis raw metadata file extension (csv, xls and xml), factory class may provide an instance of the appropriate parser class.

CSV parser 612, XML parser 614, and XLS parser 616—these parsers may parse metadata file and extract the relevant metadata information using the attribute configuration XML. It may convert the parsed data into CSV 620 and may upload it to Neo4j database 611 using the data access layer (DAL) 622 component. If any exception is encountered while parsing, parser may notify the invoker.

According to exemplary embodiments, the data adapter invocation pseudo code may include the following:
FileParserFacade facade=new FileParserFacade( );
facade.ParseFile(@"D:\NAS\MetaDataFiles\InformaticaMeta.xml",@"D:\NAS\MetaDataFiles\InformaticaConfig.xml");
facade.ParseFile(@"D:\NAS\MetaDataFiles\BO.xls", @"D:\NAS\MetaDataFiles\BOConfig.xml");

According to exemplary embodiments, the data access layer (DAL) 508 may contain all of the logic required for the business layer 506 to interact with Neo4j database 511. DAL 508 may primarily contain following components—Neo4j Connector, Cypher Query Processing, and transaction management, but the disclosure is not limited thereto.

Neo4jDotNetDriver or open source community developed Neo4jClient may be used to connect DAL 508 with Neo4j database 511.

The Neo4j .NET driver (Neo4jDotNetDriver) may be supported by Neo4j and connects to the database using the binary protocol. It aims to be minimal, while being idiomatic to .NET.

Neo4jClient is a community driven .NET library which serializes and de-serializes objects to and from JSON to interact the database server, which makes it very easy to store and retrieve objects. This API makes it easy to write Cypher queries in C# with code completion support. It also supports basic CRUD (create, read, update, and delete) operation. It is available as a NUGET package so it can be easily installed on developer machine during application development.

DAL 508 may be responsible for executing Cypher query using .Neo4jClient or Neo4jDotNetDriver. Cypher is Neo4j's declarative query language, SQL-inspired for describing patterns in graphs visually. It allows a user to state what he/she wants to select, insert, update or delete from our graph data without requiring us to describe exactly how to do it.

FIG. 6A illustrates an exemplary Cypher query syntax using Neo4jDotNetDriver in accordance with an exemplary embodiment. Neo4jClient uses C# fluent API interface to build Cypher queries as illustrated in FIG. 6B.

.NET framework base class library for transaction management may be used to handle all the transactions in the metadata application 502. While processing raw metadata files if something fails then further processing may stop, appropriate error may be logged into the configured log file for detail analysis and entire transaction may be rolled back.

According to exemplary embodiments, the Neo4j Database 511 may be a NoSQL graph database management system which stores data in the form of nodes and relationships. Like traditional relational databases Neo4j supports full database characteristics including ACID (atomicity, consistency, isolation and durability) transaction compliance, cluster support and runtime failover.

Each node (entity or attribute) in the graph database model directly and physically contains a list of relationship-records that represent its relationships to other nodes. These relationship records are organized by type and direction and may hold additional attributes. Whenever the system runs the equivalent of a JOIN operation, the database just uses this list and has direct access to the connected nodes, eliminating the need for an expensive search/match computation.

This ability of pre-materializing relationships into database structures allows Neo4j to provide performances of several orders of magnitude, especially for join heavy queries, the minutes to milliseconds advantage that many users leverage.

According to exemplary embodiments, the Network Access Storage (NAS) drive 510 may be used to store the data source specific configuration files, raw metadata files and parsed .csv files. This shared drive may be accessible to the metadata application 502 using a functional id account.

According to exemplary embodiments, the enterprise library application blocks 516 may be a collection of reusable software components (application blocks) designed to assist with common enterprise development cross-cutting concerns (such as logging, validation, data access, exception handling, etc.).

The enterprise library application blocks 516 may be used for common logging functions. This block simplifies the implementation of logging functions. With this component log information can be write to various locations like event log, email, database, text file etc. Logs may be maintained for logged in user, data load (start and end time), data validation errors.

The enterprise library application blocks 516 may also be used for common caching functions. This block may help developers to incorporate local cache in application. It supports both an in-memory cache and, optionally, a backing store that can either be the database store or isolated storage. The application block can be used without modification; it may provide all the functionality needed to retrieve, add, and remove cached data. Configurable expiration and scavenging policies are also part of the application block.

The enterprise library application blocks 516 may also be used to handle application exception. The enterprise library application block 516 for exception handling may be utilized by the developers and policy makers to create a consistent strategy for processing exceptions that occur in all architectural layers of an enterprise application.

According to exemplary embodiments, the metadata application 502 may be hosted on IIS (Internet Information Services) server and the Neo4j database 511 may be hosted on database server. Depending on the number concurrent users, a load balancer can be configured for faster request processing.

Appendix A, which has been incorporated herewith in its entirety by reference, illustrates, according to exemplary embodiments, detailed design documents for metadata management implemented by the MMM 406. Exemplary details of data load process is disclosed in section 2.3 of Appendix A and exemplary details of the archival process is disclosed in section 2.6 of Appendix A, but the disclosure is not limited thereto. Exemplarily custom upload process is disclosed in section 2.4 of Appendix A, but the disclosure is not limited thereto. Exemplary Neo4j data model is disclosed in section 2.5 of Appendix A, but the disclosure is not limited thereto. Exemplary data archival and load process are disclosed in section 2.6 of Appendix A, but the disclosure is not limited thereto. Exemplary interface design is disclosed in section 3.0 of Appendix A, but the disclosure is not limited thereto.

Referring to FIGS. 4 and 5, according to exemplary embodiments, the extracting module 414 may be configured to extract technical metadata corresponding to enterprise applications from the plurality of data sources 512. The building module 416 may be configured to build a metadata repository in a graph database 511 and build a web-based metadata application 502 based on developing a normalized representation for data flows corresponding to the extracted technical metadata by utilizing the graph database 511.

According to exemplary embodiments, the storing module 418 may be configured to store the extracted technical metadata onto the metadata repository in the graph database 511.

According to exemplary embodiments, the authenticating and authorizing module 420 may be configured to authenticate and authorize a user 501 to utilize the web-based metadata application 502. The receiving module 422 may be configured to receive search criteria from the user 501. The web-based metadata application 502 may access the metadata repository in the graph database 511 by utilizing the accessing module 424 to retrieve the technical metadata and/or data lineage within the enterprise applications from the metadata repository based on received search criteria.

According to exemplary embodiments, the displaying module 426 may be configured to display the technical metadata and/or the data lineage within the enterprise applications onto the GUI 428.

According to exemplary embodiments, the implementing module 432 may be configured to implement graph traversal techniques and pattern matching algorithm to retrieve the technical metadata and/or data lineage within the enterprise applications from the metadata repository in the graph database 511 based on different search criteria.

According to exemplary embodiments, the MMM 406 may be further configured to develop a JSON-based domain language for ingestion of external metadata; expose the external metadata via corresponding application programming interface (API); and store the external metadata onto the graph database 511, but the disclosure is not limited thereto.

According to exemplary embodiments, the profiling module 434 of the MMM 406 may be configured to profile the plurality of data sources 512 (or databases 412) and harnessing data quality statistics; and the integrating module 436 may be configured to integrate data quality statistics metrics from the plurality of data sources 512 (or databases 412) into the web-based metadata application 502.

According to exemplary embodiments, the implementing module 432 may be further configured to implement data quality suite rules to detect and improve data quality.

According to exemplary embodiments, the building module 416 may be further configured to build the metadata repository in the graph database 511 based on a heuristic based quality score model.

Figure 7A:
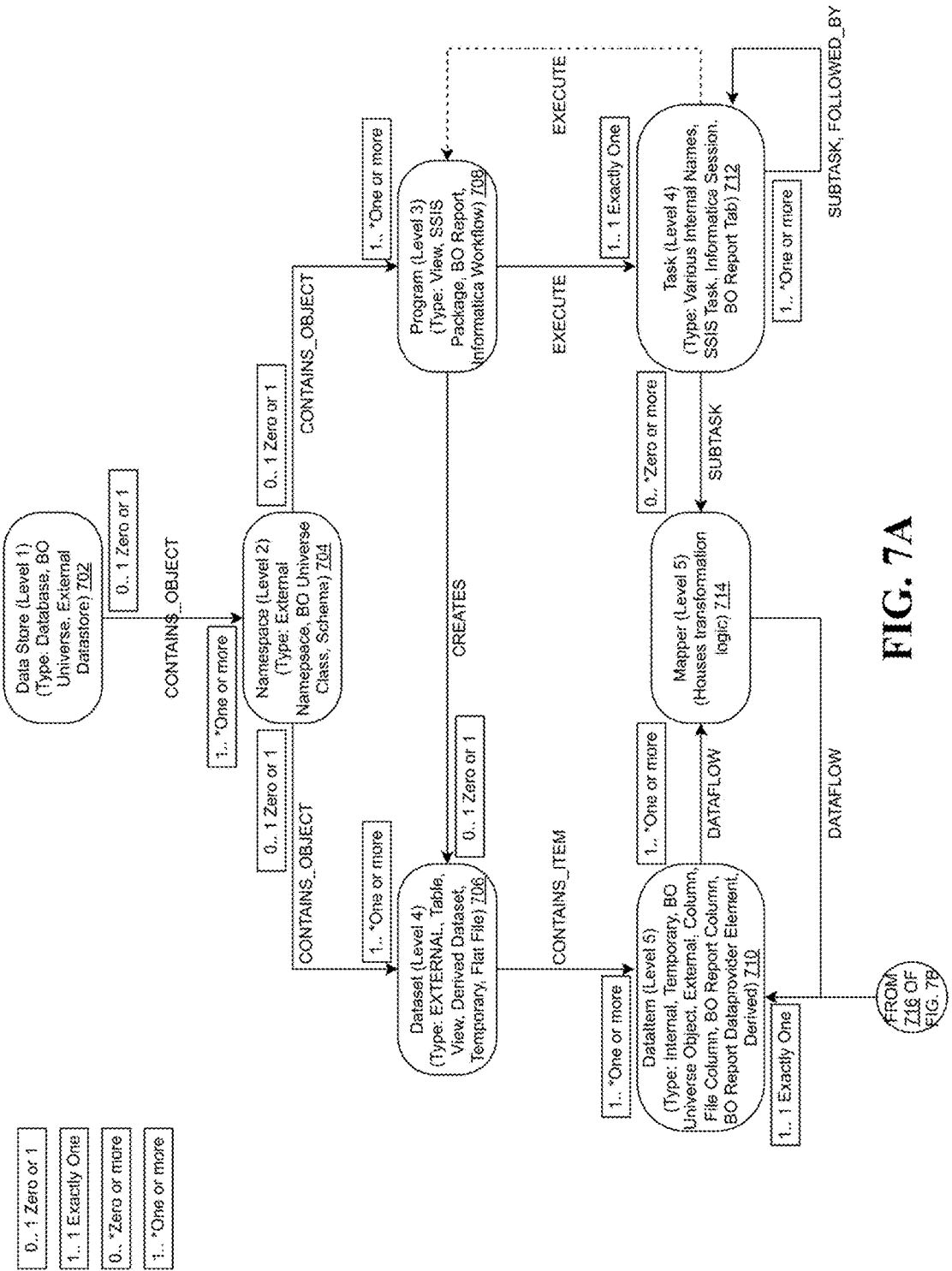
FIG. 7A illustrates a physical layer of a metadata abstraction model in accordance with an exemplary embodiment.

FIG. 7A illustrates a physical layer 700*a* of a metadata abstraction model in accordance with an exemplary embodiment. As illustrated in FIG. 7, level 702 (level 1) may be a data store level. According to exemplary embodiments, type of data store may include database, business objects (BO) universe, external data store, etc., but the disclosure is not limited thereto. Level 704 (level 2) may be a namespace level (i.e., external namespace, BO universe class, schema, etc.). Level 708 (level 3) may be program level (i.e., view, SSIS package, BO report, Informatica workflow, etc.). Level 706 (level 4) may be a dataset level (i.e., external, table, view, derived dataset temporary, flat file, etc.). Level 712 (level 4) may be a task level (i.e., various internal names, SSIS task, Informatica session, BO report tab, etc.). Level 710 (level 5) may be a data item level (i.e., internal, temporary, BO universe object, external, column, file column, BP report column, BO report data provider element, derived, etc.). Level 714 (level 5) may be a mapper level that houses transformation logic).

Figure 7B:
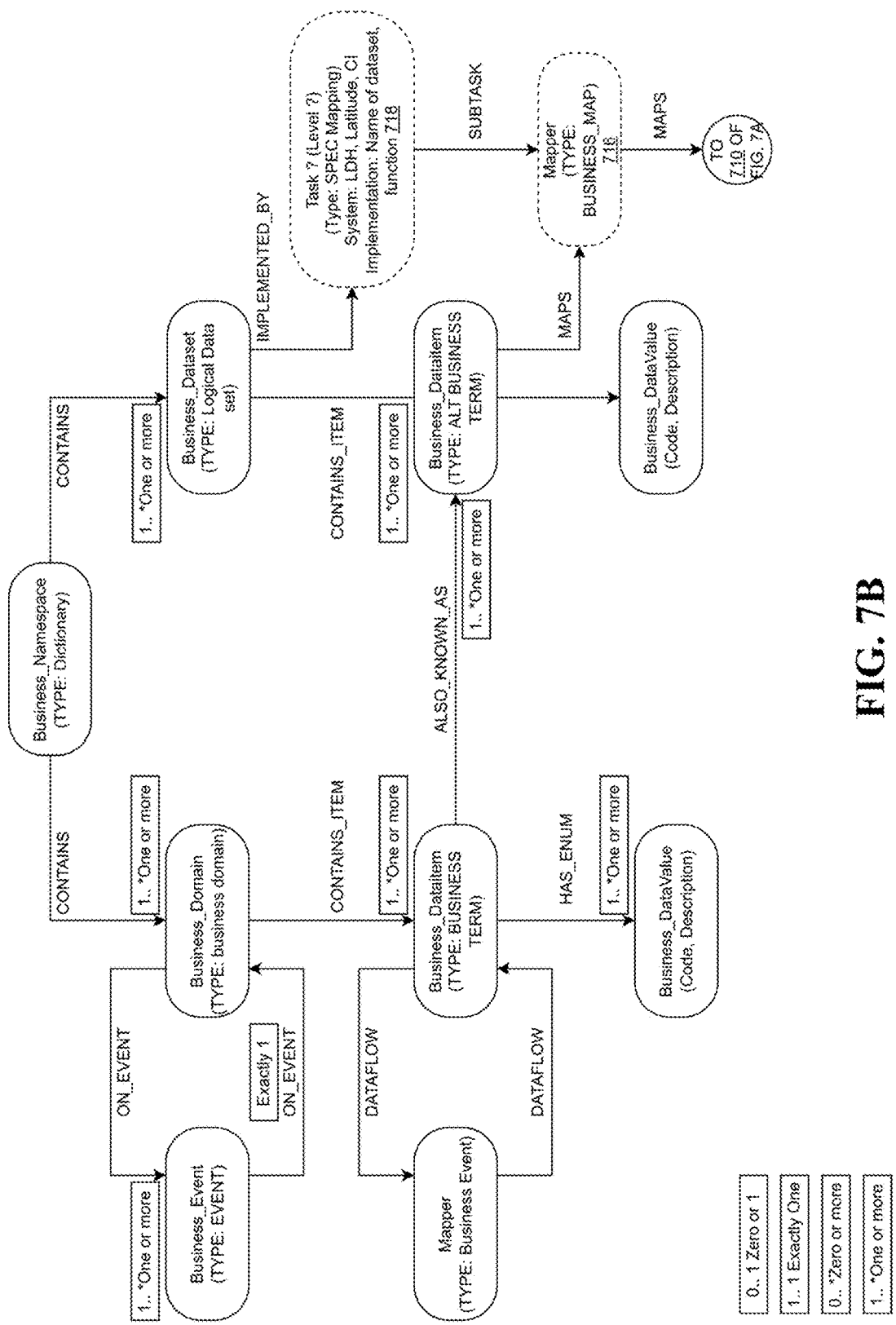
FIG. 7B illustrates a business layer of a metadata abstraction model in accordance with an exemplary embodiment.

FIG. 7B illustrates a business layer 700b of a metadata abstraction model in accordance with an exemplary embodiment which illustrates various data flow in generating data maps. For example, data maps generated at mapper 716 may be input to data item level 710 of FIG. 7A. According to exemplary embodiments, the mapper 716 may implement subtask received from block 718 (i.e., task? (level?) (type: SPEC mapping) (system: loan data hub, latitude, CI) (implementation: name of dataset, function) and maps data received from business data item.

Figure 8:
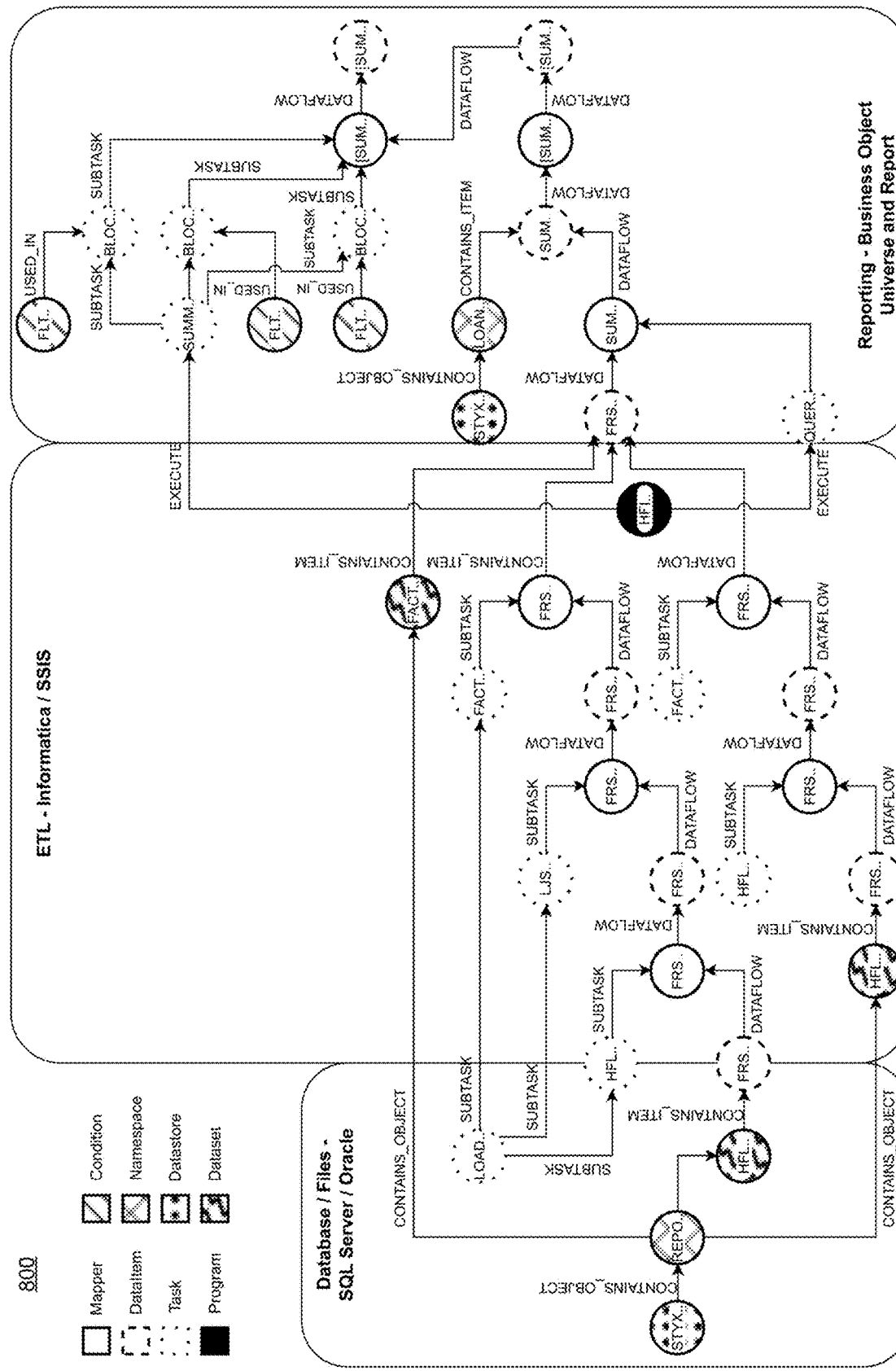
FIG. 8 illustrates an exemplary data lineage in accordance with an exemplary embodiment.

According to exemplary embodiments, the displaying module 426 may be further configured to display end to end data lineage spanning multiple technology domain in a single visual interface of the GUI 428 using a graphical representation of entity in a format of nodes and relationships. For example, FIG. 8 illustrates an exemplary data lineage 800 in accordance with an exemplary embodiment.

Figure 9:
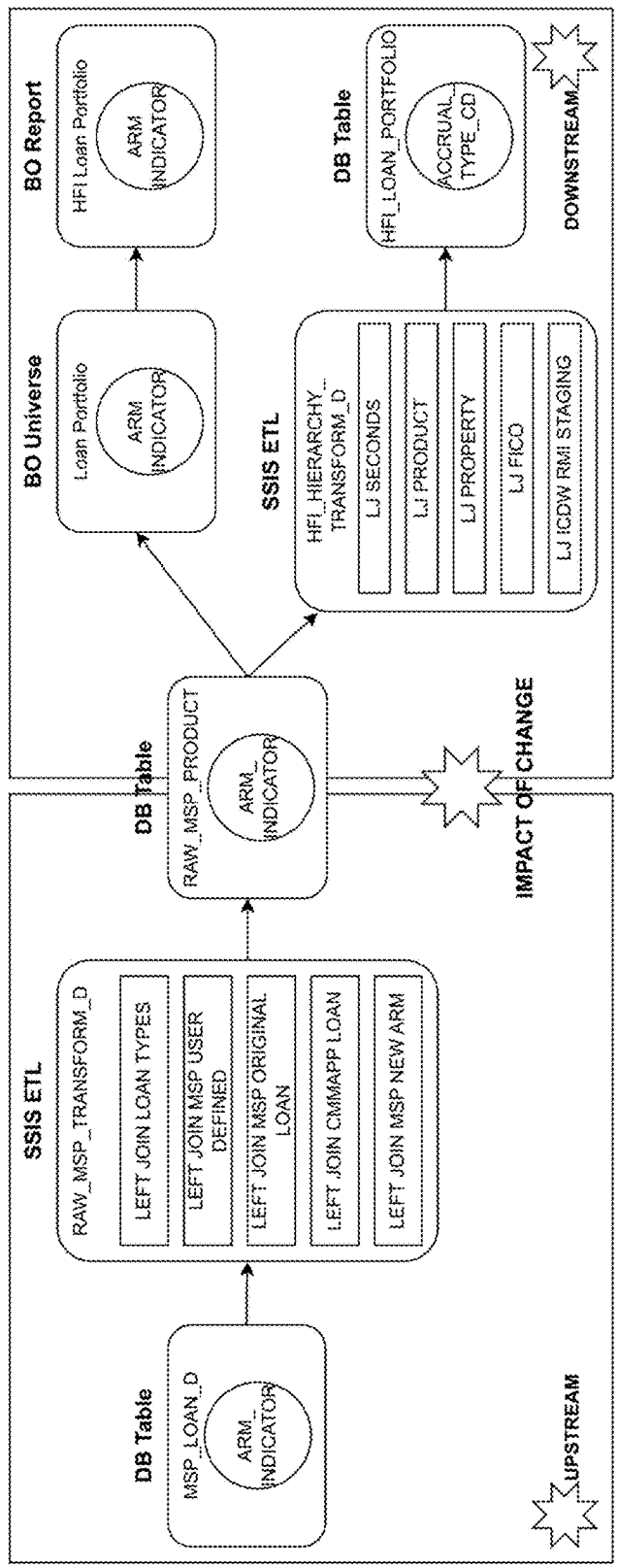
FIG. 9 illustrates an exemplary impact analysis in accordance with an exemplary embodiment.

According to exemplary embodiments, the displaying module 426 may be further configured to display impacted database objects for upstream and downstream systems onto the GUI 428. For example, FIG. 9 illustrates an exemplary impact analysis 900 in accordance with an exemplary embodiment.

Figure 10:
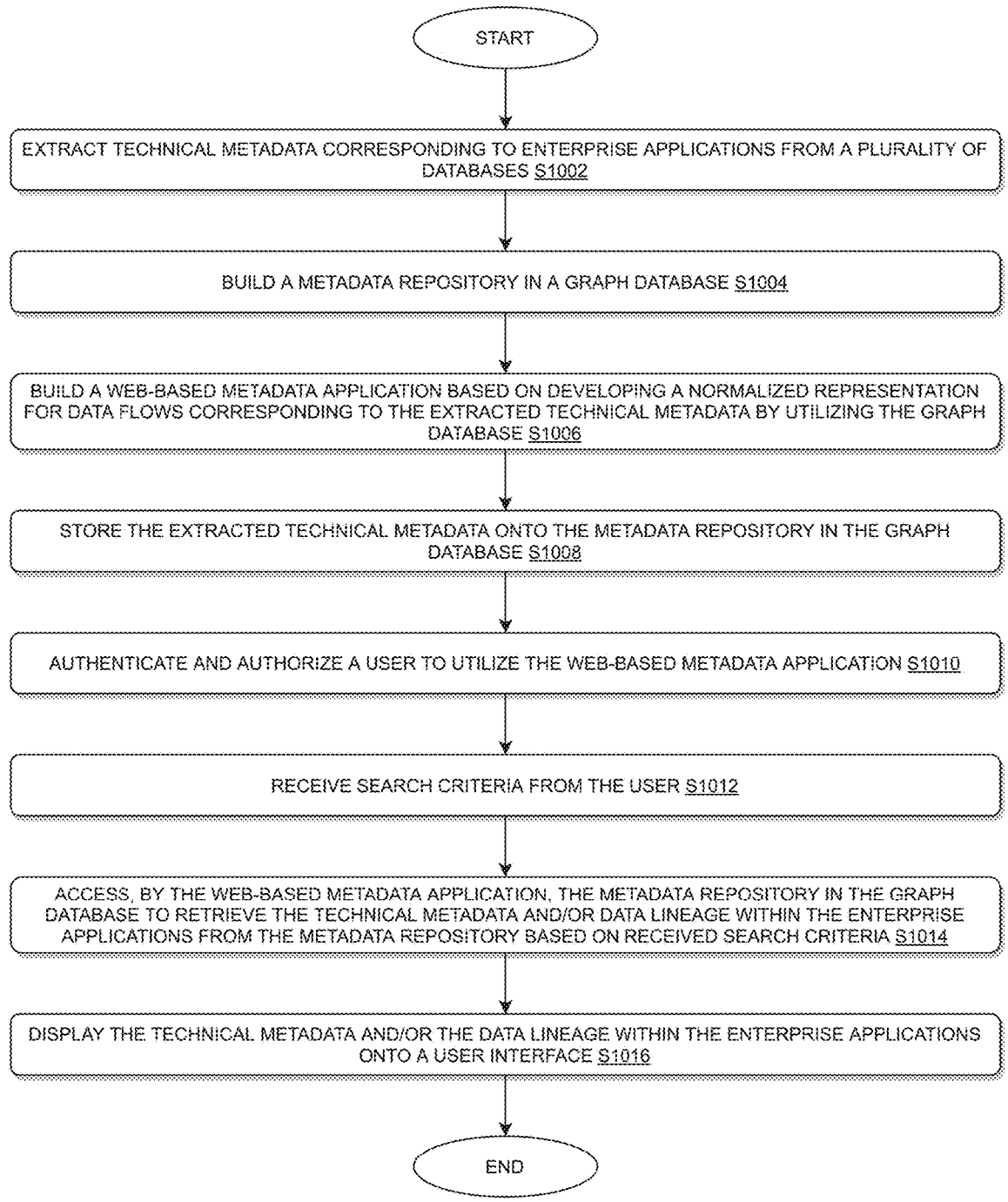
FIG. 10 illustrates a flow diagram of metadata management process executed by the metadata management module of FIG. 4 in accordance with an exemplary embodiment.

FIG. 10 illustrates a flow diagram of metadata management process 1000 executed by the metadata management module of FIG. 4 in accordance with an exemplary embodiment.

At step 1002, the metadata management process 1000 may include: extracting technical metadata corresponding to enterprise applications from a plurality of databases.

At step 1004, the metadata management process 1000 may include: building a metadata repository in a graph database.

At step 1006, the metadata management process 1000 may include: building a web-based metadata application based on developing a normalized representation for data flows corresponding to the extracted technical metadata by utilizing the graph database.

At step 1008, the metadata management process 1000 may include: storing the extracted technical metadata onto the metadata repository in the graph database.

At step 1010, the metadata management process 1000 may include: authenticating and authorizing a user to utilize the web-based metadata application.

At step 1012, the metadata management process 1000 may include: receiving search criteria from the user.

At step 1014, the metadata management process 1000 may include: accessing, by the web-based metadata application, the metadata repository in the graph database to retrieve the technical metadata and/or data lineage within the enterprise applications from the metadata repository based on received search criteria.

At step 1016, the metadata management process 1000 may include: displaying the technical metadata and/or the data lineage within the enterprise applications onto a user interface.

According to exemplary embodiments, the metadata management process 1000 may further include: implementing graph traversal techniques and pattern matching algorithm to retrieve the technical metadata and/or data lineage within the enterprise applications from the metadata repository based on different search criteria.

According to exemplary embodiments, the metadata management process 1000 may further include: developing a JSON-based domain language for ingestion of external metadata; and exposing the external metadata via corresponding application programming interface (API); and storing the external metadata onto the graph database, but the disclosure is not limited thereto.

According to exemplary embodiments, the metadata management process 1000 may further include: profiling the plurality of databases and harnessing data quality statistics; and integrating data quality statistics metrics from the plurality of databases into the web-based metadata application.

According to exemplary embodiments, the metadata management process 1000 may further include: implementing data quality suite rules to detect and improve data quality.

According to exemplary embodiments, the data quality statistics metrics may include one or more of the following data: total count data, percentage of null data, distinct values data, sample values data, and standard summary statistics data, but the disclosure is not limited thereto.

According to exemplary embodiments, the metadata management process 1000 may further include: building the metadata repository in the graph database based on a heuristic based quality score model.

According to exemplary embodiments, the metadata management process 1000 may further include: displaying end to end data lineage spanning multiple technology domain in a single visual interface of the user interface using a graphical representation of entity in a format of nodes and relationships.

According to exemplary embodiments, the metadata management process 1000 may further include: displaying impacted database objects for upstream and downstream systems onto the graphical interface.

According to exemplary embodiments, the MMD 402 may include a memory (e.g., a memory 106 as illustrated in FIG. 1) which may be a non-transitory computer readable medium that may be configured to store instructions for implementing an MMM 406 for managing metadata as disclosed herein. The MMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the MMM 406 or within the MMD 402, may be used to perform one or more of the methods and processes as described herein. In a particular embodiment, the instructions may reside completely, or at least partially, within the memory 106, the medium reader 112, and/or the processor 104 (see FIG. 1) during execution by the MMD 402.

For example, the instructions, when executed, may cause the processor 104 to perform the following: extracting technical metadata corresponding to enterprise applications from a plurality of databases; building a metadata repository in a graph database; building a web-based metadata application based on developing a normalized representation for data flows corresponding to the extracted technical metadata by utilizing the graph database; storing the extracted technical metadata onto the metadata repository in the graph database; authenticating and authorizing a user to utilize the web-based metadata application; receiving search criteria from the user; accessing, by the web-based metadata application, the metadata repository in the graph database to retrieve the technical metadata and/or data lineage within the enterprise applications from the metadata repository based on received search criteria; and displaying the technical metadata and/or the data lineage within the enterprise applications onto a user interface.

According to exemplary embodiments, the instructions, when executed, may cause the processor 104 to further perform the following: implementing graph traversal techniques and pattern matching algorithm to retrieve the technical metadata and/or data lineage within the enterprise applications from the metadata repository based on different search criteria.

According to exemplary embodiments, the instructions, when executed, may cause the processor 104 to further perform the following: developing a JSON-based domain language for ingestion of external metadata; and exposing the external metadata via corresponding application programming interface (API); and storing the external metadata onto the graph database, but the disclosure is not limited thereto.

According to exemplary embodiments, the instructions, when executed, may cause the processor 104 to further perform the following: profiling the plurality of databases and harnessing data quality statistics; and integrating data quality statistics metrics from the plurality of databases into the web-based metadata application.

According to exemplary embodiments, the instructions, when executed, may cause the processor 104 to further perform the following: implementing data quality suite rules to detect and improve data quality.

According to exemplary embodiments, the instructions, when executed, may cause the processor 104 to further perform the following: building the metadata repository in the graph database based on a heuristic based quality score model.

According to exemplary embodiments, the instructions, when executed, may cause the processor 104 to further perform the following: displaying end to end data lineage spanning multiple technology domain in a single visual interface of the user interface using a graphical representation of entity in a format of nodes and relationships.

According to exemplary embodiments, the instructions, when executed, may cause the processor 104 to further perform the following: displaying impacted database objects for upstream and downstream systems onto the graphical interface.

According to exemplary embodiments as disclosed above in FIGS. 1-10, technical improvements effected by the instant disclosure may include platforms for implementing a metadata management module that utilizes graph databases for representing structured data movement within an enterprise, thereby providing transparency into data flow and transformation landscape within systems (i.e., systems for capital market data, systems for loan data, etc., but the disclosure is not limited thereto), increasing confidence of stakeholders and upper management in the trust worthiness of the data, providing a platform for governance and management of data elements within a line of business (LOB), improving developer productivity by reducing effort on data lineage analysis, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing metadata by utilizing one or more processors and one or more memories, the method comprising:
    extracting, by said one or more processors, technical metadata corresponding to enterprise applications from a plurality of databases;
    building, by said one or more processors, a metadata repository in a graph database based on a heuristic based quality score model;
    building, by said one or more processors, a web-based metadata application based on developing a normalized representation for data flows corresponding to the extracted technical metadata by utilizing the graph database;
    storing, by said one or more processors, the extracted technical metadata onto the metadata repository in the graph database;
    authenticating and authorizing, by said one or more processors, a user to utilize the web-based metadata application;
    receiving, by said one or more processors, search criteria from the user;
    accessing, by said one or more processors, by the web-based metadata application, the metadata repository in the graph database to retrieve the technical metadata and/or data lineage within the enterprise applications from the metadata repository based on received search criteria; and
    displaying the technical metadata and/or the data lineage within the enterprise applications onto a user interface.

2. The method according to claim 1, wherein the graph database is a NEO4J graph database.

3. The method according to claim 1, further comprising:
    implementing, by said one or more processors, graph traversal techniques and pattern matching algorithm to retrieve the technical metadata and/or data lineage within the enterprise applications from the metadata repository based on different search criteria.

4. The method according to claim 1, further comprising:
    developing, by said one or more processors, a JSON-based domain language for ingestion of external metadata; and
    exposing, by said one or more processors, the external metadata via corresponding application programming interface (API); and
    storing, by said one or more processors, the external metadata onto the graph database.

5. The method according to claim 1, further comprising:
    profiling, by said one or more processors, the plurality of databases and harnessing data quality statistics; and
    integrating, by said one or more processors, data quality statistics metrics from the plurality of databases into the web-based metadata application.

6. The method according to claim 5, further comprising:
    implementing, by said one or more processors, data quality suite rules to detect and improve data quality.

7. The method according to claim 5, wherein the data quality statistics metrics include one or more of the following data: total count data, percentage of null data, distinct values data, sample values data, and standard summary statistics data.

8. The method according to claim 1, further comprising:
    displaying end to end data lineage spanning multiple technology domain in a single visual interface of the user interface using a graphical representation of entity in a format of nodes and relationships.

9. The method according to claim 1, further comprising:
    displaying impacted database objects for upstream and downstream systems onto the graphical interface.

10. A system for managing metadata, the system comprising:
    a plurality of databases that store technical metadata corresponding to enterprise applications; and
    a processor operatively coupled to the plurality of databases via a communication network, wherein the processor is configured to:
        extract technical metadata corresponding to enterprise applications from a plurality of databases;

build a metadata repository in a graph database based on a heuristic based quality score model;
build a web-based metadata application based on developing a normalized representation for data flows corresponding to the extracted technical metadata by utilizing the graph database;
store the extracted technical metadata onto the metadata repository in the graph database;
authenticate and authorize a user to utilize the web-based metadata application;
receive search criteria from the user;
access, by the web-based metadata application, the metadata repository in the graph database to retrieve the technical metadata and/or data lineage within the enterprise applications from the metadata repository based on received search criteria; and
display the technical metadata and/or the data lineage within the enterprise applications onto a user interface.

11. The system according to claim 10, wherein the processor is further configured to:
implement graph traversal techniques and pattern matching algorithm to retrieve the technical metadata and/or data lineage within the enterprise applications from the metadata repository based on different search criteria.

12. The system according to claim 10, wherein the processor is bother configured to:
develop a JSON-based domain language for ingestion of external metadata; and
expose the external metadata via corresponding application programming interface (API); and
store the external metadata onto the graph database.

13. The system according to claim 10, wherein the processor is further configured to:
profile the plurality of databases and harnessing data quality statistics; and
integrate data quality statistics metrics from the plurality of databases into the web-based metadata application.

14. The system according to claim 13, wherein the processor is further configured to:
implement data quality suite rules to detect and improve data quality.

15. The system according to claim 13, wherein the data quality statistics metrics include one or more of the following data: total count data, percentage of null data, distinct values data, sample values data, and standard summary statistics data.

16. The system according to claim 10, wherein the processor is further configured to:
display end to end data lineage spanning multiple technology domain in a single visual interface of the user interface using a graphical representation of entity in a format of nodes and relationships.

17. The system according to claim 10, wherein the processor is further configured to:
display impacted database objects for upstream and downstream systems onto the graphical interface.

18. A non-transitory computer readable medium configured to store instructions for managing metadata wherein, when executed the instructions cause a processor to perform the following:
extracting technical metadata corresponding to enterprise applications from a plurality of databases;
building a metadata repository in a graph database based on a heuristic based quality score model;
building a web-based metadata application based on developing a normalized representation for data flows corresponding to the extracted technical metadata by utilizing the graph database;
storing the extracted technical metadata onto the metadata repository in the graph database;
authenticating and authorizing a user to utilize the web-based metadata application;
receiving search criteria from the user;
accessing, by the web-based metadata application, the metadata repository in the graph database to retrieve the technical metadata and/or data lineage within the enterprise applications from the metadata repository based on received search criteria; and
displaying the technical metadata and/or the data lineage within the enterprise applications onto a user interface.

19. The non-transitory computer readable medium according to claim 18, wherein, when executed, the instructions cause the processor to further perform the following:
implementing graph traversal techniques and pattern matching algorithm to retrieve the technical metadata and/or data lineage within the enterprise applications from the metadata repository based on different search criteria.

20. The non-transitory computer readable medium according to claim 18, wherein, when executed, the instructions cause the processor to further perform the following:
profiling the plurality of databases and harnessing data quality statistics;
integrating data quality statistics metrics from the plurality of databases into the web-based metadata application; and
implementing data quality suite rules to detect and improve data quality,
wherein the data quality statistics metrics include one or more of the following data: total count data, percentage of null data, distinct values data, sample values data, and standard summary statistics data.

* * * * *